(12) United States Patent
Bruguera

(10) Patent No.: US 10,140,094 B2
(45) Date of Patent: Nov. 27, 2018

(54) ROUNDING CIRCUITRY AND METHOD

(71) Applicant: ARM LIMITED, Cambridge (GB)

(72) Inventor: Javier Diaz Bruguera, Austin, TX (US)

(73) Assignee: ARM Limited, Cambridge (GB)

( * ) Notice: Subject to any disclaimer, the term of this patent is extended or adjusted under 35 U.S.C. 154(b) by 185 days.

(21) Appl. No.: 15/162,804

(22) Filed: May 24, 2016

(65) Prior Publication Data

US 2017/0344342 A1 Nov. 30, 2017

(51) Int. Cl.
*G06F 7/499* (2006.01)
*G06F 7/50* (2006.01)

(52) U.S. Cl.
CPC ............ *G06F 7/49947* (2013.01); *G06F 7/50* (2013.01)

(58) Field of Classification Search
CPC .................................................. G06F 7/49947
USPC ......................................................... 708/497
See application file for complete search history.

(56) References Cited

U.S. PATENT DOCUMENTS

| 5,170,371 A * | 12/1992 | Darley ................... G06F 7/4876 |
| | | 708/204 |
| 2007/0043801 A1* | 2/2007 | Kurd ...................... G06F 7/5334 |
| | | 708/490 |
| 2016/0098248 A1* | 4/2016 | Carlough ............ G06F 7/49947 |
| | | 708/201 |

OTHER PUBLICATIONS

D. Piso, J.D. Bruguera, Variable Latency Rounding for Goldschmidt Algorithm with Parallel Remainder Estimation, 2009 12th Euromircro Conference on Digital System Design/Architectures, Methods, and Tools, IEEE Computer Society, 2009, p. 293-300.*
D. Piso, J.D. Bruguera, A New Rounding Method Based on Parallel Remainder Estimation for Goldschmidt and Newton-Raphson Algorithms, 2014 17th Euromicro Conference on Digital System Design, IEEE, Conference Publishing Services, 2014, p. 639-642.*
D. Piso, J.D. Bruguera, A new rounding algorithm for variable latency division and square root implementations, 11th Euromicro converence on Digital System Design Architectures, Methods and Tools, IEEE Computer Society, 2008, p. 760-767.*
D. Piso, J.D. Bruguera, Simplifying the Rounding for Newton-Raphson Algorithm with Parallel Remainder, Asilomar 2009, IEEE, 2009, p. 921-925.*
D. Piso, J.D. Bruguera, Variable Latency Goldschmidt Algorithm Based on a New Rounding Method and a Remainder Estimate, IEEE Transactions on Computers, vol. 60, No. 11, Nov. 2011, IEEE Computer Society, 2011, p. 1535-1546.*

* cited by examiner

*Primary Examiner* — Matthew D Sandifer
*Assistant Examiner* — Emily E Larocque
(74) *Attorney, Agent, or Firm* — Nixon & Vanderhye P.C.

(57) ABSTRACT

A data processing apparatus for performing rounding on an input value to produce a rounded form output value includes floor calculation circuitry that receives the input value in redundant-representation and generates two candidates of a floor of the input value in non-redundant representation. Ceiling calculation circuitry receives the input value in redundant-representation and generates two candidates of a ceiling of the input value in non-redundant representation. Selection circuitry outputs one of the two candidates of the floor of said input value and the two candidates of the ceiling of said input value as the rounded form output value, based on a sign of a residual value associated with the input value. Each of the two candidates of the floor of the input value correspond with different values of the sign of the residual value and each of the two candidates of the ceiling of said input value correspond with different values of the sign of said residual value.

15 Claims, 7 Drawing Sheets

ROUNDING CIRCUITRY AND METHOD

BACKGROUND

Technical Field

The present disclosure relates to rounding in a data processing apparatus.

Description

In a data processing apparatus, a rounding process is used to determine what should be output when the result of a mathematical operation lies between two possible outputs. For example, where the division of 1 by 4 is desired, to one decimal place, the actual result is 0.25, but possible outputs are either 0.2 or 0.3. Rounding circuitry is provided in order to perform a rounding operation to one of the possible outputs. The actual output is dependent on both the actual result together with a specified rounding mode. It is desirable for rounding circuitry to operate quickly since rounding is often performed after mathematical operations.

SUMMARY

Viewed from a first example configuration, there is provided a data processing apparatus to perform rounding on an input value to produce a rounded form output value, said data processing apparatus comprising: floor calculation circuitry to receive said input value in redundant-representation and to generate two candidates of a floor of said input value in non-redundant representation; ceiling calculation circuitry to receive said input value in redundant-representation and to generate two candidates of a ceiling of said input value in non-redundant representation; selection circuitry to output one of said two candidates of said floor of said input value and said two candidates of said ceiling of said input value as said rounded form output value, based on a sign of a residual value associated with said input value, wherein each of said two candidates of said floor of said input value correspond with different values of said sign of said residual value and each of said two candidates of said ceiling of said input value correspond with different values of said sign of said residual value.

Viewed from a second example configuration, there is provided a data processing method to perform rounding on an input value to produce a rounded form output value, said data processing method comprising steps: receiving said input value in redundant-representation; generating two candidates of a floor of said input value in non-redundant representation; generating two candidates of a ceiling of said input value in non-redundant representation; outputting one of said two candidates of said floor of said input value and said two candidates of said ceiling of said input value as said rounded form output value, based on a sign of a residual value associated with said input value, wherein each of said two candidates of said floor of said input value correspond with different values of said sign of said residual value and each of said two candidates of said ceiling of said input value correspond with different values of said sign of said residual value.

Viewed from a third example configuration, there is provided a data processing apparatus to perform rounding on an input value to produce a rounded form output value, said data processing apparatus comprising: means for receiving said input value in redundant-representation and for generating two candidates of a floor of said input value in non-redundant representation; means for receiving said input value in redundant-representation and for generating two candidates of a ceiling of said input value in non-redundant representation; means for outputting one of said two candidates of said floor of said input value and said two candidates of said ceiling of said input value as said rounded form output value, based on a sign of a residual value associated with said input value, wherein each of said two candidates of said floor of said input value correspond with different values of said sign of said residual value and each of said two candidates of said ceiling of said input value correspond with different values of said sign of said residual value.

BRIEF DESCRIPTION OF THE DRAWINGS

The present invention will be described further, by way of example only, with reference to embodiments thereof as illustrated in the accompanying drawings, in which.

DESCRIPTION OF EXAMPLE EMBODIMENTS

Figure 1:
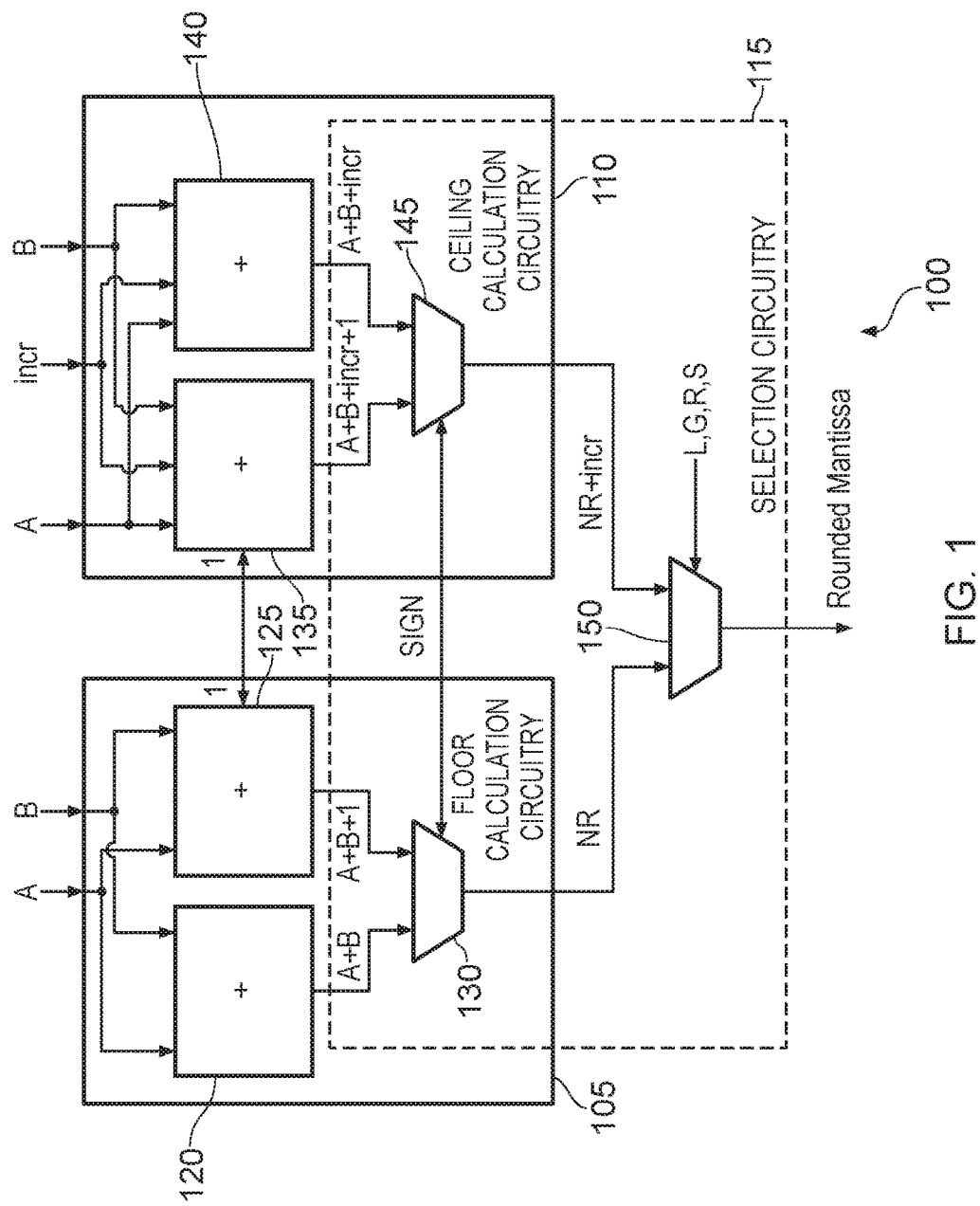
FIG. 1 schematically illustrates a data processing apparatus for rounding in accordance with one embodiment.

Before discussing the embodiments with reference to the accompanying figures, the following description of embodiments is provided followed by a brief discussion regarding the representation and process of rounding floating point numbers.

In accordance with one example configuration there is provided a data processing apparatus to perform rounding on an input value to produce a rounded form output value, said data processing apparatus comprising: floor calculation circuitry to receive said input value in redundant-representation and to generate two candidates of a floor of said input value in non-redundant representation; ceiling calculation circuitry to receive said input value in redundant-representation and to generate two candidates of a ceiling of said input value in non-redundant representation; selection circuitry to output one of said two candidates of said floor of said input value and said two candidates of said ceiling of said input value as said rounded form output value, based on a sign of a residual value associated with said input value, wherein each of said two candidates of said floor of said input value correspond with different values of said sign of said residual value and each of said two candidates of said ceiling of said input value correspond with different values of said sign of said residual value.

The data processing apparatus is concerned with producing values in rounded form. The rounded form could involve rounding the input to a certain number of decimal places, or even to an integer (zero decimal places). For example, the value 11.45 could be rounded to 1 decimal place to give either 11.4 or 11.5, or to an integer value to give 11 or 12.

In each case, the lower limit to which the input value can be rounded is known as the floor and the upper limit to which the input value can be rounded is known as the ceiling. The floor calculation circuitry determines two candidate values for the floor of the input value and the ceiling calculation circuitry determines two candidate values for the ceiling of the input value. The selection circuitry determines, from these four candidates, what the output will be. In other words, the selection circuitry determines from the four candidates, what the rounded value of the input value is. The input value is associated with a residual value. For example, the input value could be a quotient value with a corresponding remainder (residual value) from a division operation. Similarly, the input value and the residual value might derive from a square root operation. A sign of the residual value indicates whether the least significant bits of the input value (i.e. the final digit) are slightly too high or slightly too low. Accordingly, of the two candidate floor values, one candidate corresponds with the sign of the residual being positive and the other corresponds with the sign of the residual being negative. Similarly for the two candidate ceiling values. Accordingly, the selection circuitry's determination is based (at least in part) on the actual sign of the residual value. The input value is received in redundant representation. Redundant representation represents a number in two words rather than one word. There are numerous ways in this might be done. For example, one word could represent a 'sum' value and the second word could represent a 'carry' value. In other cases, one word could represent positive values and the second word could represent negative values. Redundant representation is often used in circuitry because of the increased efficiency that can be gained as a result of performing operations of numbers stored in redundant representation. However, for certain operations, it is necessary to convert the redundant-representation into a non-redundant representation by adding or subtracting the two words. The exact operation requires to perform the conversion is dependent on the actual form of redundant representation being used.

In some embodiments, said residual value is received by said data processing apparatus in redundant representation. Accordingly, in order to determine a sign of the residual value, residual conversion circuitry can be used to convert said residual value from redundant representation to non-redundant representation.

In some embodiments, said residual conversion circuitry operates to convert said residual value prior to said sign of said residual value being required by said selection circuitry. In this way, the determination of the sign of the residual value is not on the critical path of the rounding process. Since the process of determining the sign of the residual value can be time consuming when the residual value is given in redundant representation, this can represent a saving in time when performing the rounding operation.

In some embodiments, said selection circuitry comprises: first selection circuitry to select one of said two candidates of said floor of said input value as said floor of said input value, based on said sign of said residual value; second selection circuitry to select one of said two candidates of said ceiling of said input value as said ceiling of said input value, based on said sign of said residual value; and third selection circuitry to select one of said floor of said input value and said ceiling of said input value. The first selection circuitry receives two candidates for the floor of the input value. One candidate depends on the sign of the residual value being positive and the other candidate depends on the sign of the residual value being negative. The selection circuitry then outputs one of the two candidates in dependence on what the actual sign of the residual value is. A similar situation occurs in respect of the second selection circuitry receiving the two candidates for the ceiling of the input value. By delaying the point at which the sign of the residual is actually required, the determination of the sign can be removed from the critical path. The third selection circuitry then determines whether rounding should occur in favour of the candidate floor value or the candidate ceiling value and the selected floor or ceiling candidate is output as the rounded input value, i.e. the rounded form output value.

There are a number of ways in which the third selection circuitry can select one of the floor or ceiling. However, in some embodiments, said third selection circuitry is to select one of said floor of said input value and said ceiling of said input value based on a rounding mode and a subset of least significant bits of said input value. The rounding mode represents an algorithm to be used in determining how to round—for example, round to odd; round to minus infinity; round to plus infinity; round towards zero; round to nearest, ties to away from zero; and round to nearest, ties to even are all examples of rounding modes and can be selected depending on the behaviour of the underlying system, by the user, or depending on the operation being performed. In any case, a subset of the least significant bits of the input value is used to determine, for a given rounding mode, which way to round the input value. For example, if the rounding mode is "round to nearest, ties to away from zero" then it is important to know whether the floor or ceiling is nearer and this requires knowledge of the least significant bits to determine.

In some embodiments, said third selection circuitry is to select one of said floor of said input value and said ceiling of said input value further based on said residual value. This is generally the case where the input value, viewed in isolation, gives no indication as to which of the ceiling or floor values should be chosen. For example, in the "round to nearest . . . " rounding modes, it could be that the input value is equidistant from the floor and the ceiling values. In order to make a determination, therefore, the residual value is used to select one value or the other.

In some embodiments, said input value is made up of a first input word and a second input word; said floor calculation circuitry comprises first adder circuitry to perform an addition based on said first input word and said second input word to produce one of said two candidates of said floor of said input value; and said ceiling calculation circuitry comprises second adder circuitry to perform an addition based on said first input word, said second input word, a difference between said ceiling value and said floor value, and a binary value '1' to produce one of said two candidates of said ceiling of said input value. The first input word and the second input word are provided so that the input value can be provided in redundant representation. The first adder circuitry adds the first input word and second input word such that the result is in a non-redundant representation. The second adder circuitry similarly adds the first and second input words together. However, the second adder circuitry additionally adds a difference between the floor and ceiling values so that the output is a ceiling value. The binary value '1' is also added by the second adder circuitry since the output of the second adder circuitry represents the situation in which the sign of the residual value is a 0, meaning that the residual value is positive. No binary value is added by the first adder circuitry, which corresponds with the situation in which the sign of the residual value is 1, meaning that the residual value is negative.

In some embodiments, said floor calculation circuitry comprises third adder circuitry to perform an addition based on said first input word, said second input word, and a binary value '1' to produce a second of said two candidates of said floor of said input value; and said ceiling calculation circuitry comprises fourth adder circuitry to perform an addition based on said first input word, said second input word, and a difference between said ceiling value and said floor value to produce a second of said two candidates of said ceiling of said input value. In such embodiments, four adder circuits are used to produce each of the four candidate values.

In some embodiments, said first adder circuitry, said second adder circuitry, said third adder circuitry, and said fourth adder circuitry are arranged to perform substantially in parallel. For example, the operations performed by the four adder circuits could overlap. As another example, there could be a contiguous period of time in which at least one of the four adder circuits is operating. By operating substantially in parallel, the fact that four candidate values are produced causes little to no increase in the operation time as compares to the time required to produce one candidate value.

In some embodiments, said floor calculation circuitry comprises first adjustment circuitry to produce a second of said two candidates of said floor of said input value based on said one of said two candidates of said floor of said input value, said first input word, said second input word, and said one of said two candidates of said ceiling of said input value; and said ceiling calculation circuitry comprises second adjustment circuitry to produce a second of said two candidates of said ceiling of said input value, based on said one of said two candidates of said floor of said input value, said first input word, said second input word, said difference between said ceiling value and said floor value, and said one of said two candidates of said ceiling of said input value. As an alternative to independently producing four candidate values using adder circuits, it is possible to use two adder circuits to produce one candidate floor value and one candidate ceiling value and then use simple logic in order to determine the other candidate floor value and the other candidate ceiling value. This can result in smaller first adjustment circuitry and second adjustment circuitry than when adder circuits are used, without any substantial increase in processing time.

Such logic can be provided in a number of different ways. However, in some embodiments, said first adjustment circuitry and said second adjustment circuitry each comprise a 2:1 multiplexer that receives inputs based on said one of said two candidates of said floor of said input value and said one of said two candidates of said ceiling of said input value. In some embodiments the inputs are based on said one of said two candidates of said floor of said input value and said one of said two candidates of said ceiling of said input value such that a subset of the most significant bits of said one of said two candidates of said floor of said input value and a subset of the most significant bits of said one of said two candidates of said ceiling of said input value are received.

In some embodiments, each said 2:1 multiplexer has a width of at least n bits, where n is a number of fractional bits of said input value.

In some other embodiments, each said 2:1 multiplexer has a width of at least ceiling($\log_2(2^{x+2}+1)$) bits and less than n bits, where x is a number of excess bits of said input value. For example, in a digit recurrence algorithm, one or more bits of an output value are determined at each iteration. However, different representations of numbers require different numbers of bits for different parts of the number. For example, a floating point double uses 52 bits to represent the significand of a floating point number. If the result of the computation is guaranteed to be within the range 1≤result<2 then no round bit is required, but a guard bit is still required. Producing a floating point double in this manner therefore requires 53 bits (52 bits for the significand plus one guard bit). If the redundant representation circuitry is such that two bits are determined at each iteration then it is not possible to output exactly 53 bits. Instead, 54 bits must be output. Accordingly, the input value will have 54 bits, and so there will be one (54–53) excess bit. Accordingly, in such embodiments, it is possible to perform adjustment using a smaller multiplexer as opposed to a larger multiplexer. Consequently, the circuit size can be reduced.

Having provided a brief description of certain embodiments, a brief discussion of the representation and process of rounding floating point numbers will be provided.

Most floating point (FP) operations are required by the IEEE-754 standard to be computed as if the operation were done with unbounded range and precision, and then rounded to fit into an FP number. If the computation exactly matches an FP number, then that value is always returned, but usually the computation results in a value that lies between two consecutive floating-point numbers. Rounding is the process of picking which of the two consecutive numbers should be returned.

There are a number of ways of rounding, called rounding modes; six of these are:

| mode | | definition |
|---|---|---|
| RNE | round-to nearest, ties to even | pick the closest value, or if both values are equally close then pick the even value |
| RNA | round to nearest, ties to away | pick the closest value, or if both values are equally close then pick the value farthest away from zero |
| RZ | round to zero | pick the value closest to zero |
| RP | round to plus infinity | pick the value closest to plus infinity |
| RM | round to minus infinity | pick the value closest to minus infinity |
| RX | round to odd | pick the odd value |

The definition doesn't tell us how to round in any practical way. One common implementation is to do the operation, look at the truncated value (i.e. the value that fits into the FP format) as well as all of the remaining bits, and then adjust the truncated value if certain conditions hold. These computations are all based on:

L—(least) the least significant bit of the truncated value
G—(guard) the next most significant bit (i.e. the first bit not included in the truncation)
R—(round) the next most significant bit (i.e. the second bit not included in the truncation). Necessary for rounding only if the result is greater than or equal to 0.5 and less than 1.0 rather than being at least 1.0 and less 2.0. The rounding bit is used for normalization by left shifting by one bit so that a number greater than or equal to 0.5 and less than 1.0 becomes at least 1.0 and less than 2.0. The round bit then becomes the guard bit (defined above)
S—(sticky) the logical OR of all remaining bits that are not part of the truncation Given these values and the truncated value, we can compute the correctly rounded value according to the following table:

| mode | change to the truncated value |
|------|-------------------------------|
| RNE  | increment if (L&G)|(G&S)      |
| RNA  | increment if G                |
| RZ   | none                          |
| RP   | increment if positive & (G|S) |
| RM   | increment if negative & (G|S) |
| RX   | set L if G|S                  |

This assumes that the result is at least 1.0 and less than 2.0. If the result is instead at least 0.5 and less than 1.0 then there are two options. Firstly, the rounding bit can be used to obtain the correctly rounded value (as described above). Secondly, the result can be left shifted by one bit prior to rounding. In this way, the round bit becomes the guard bit.

For example, consider multiplying two 4-bit significands, and then rounding to a 4-bit significand.

sig1=1011 (decimal 11)
sig2=0111 (decimal 7)
multiplying yields
sig1×sig2=1001_101 (decimal 77)

The least significant bit of the truncated 4-bit result is labeled L, the next bit G, and S is the logical OR of the remaining bits (i.e. S=0|1=1). To round, we adjust our 4-bit result (1001) according to the rounding mode and the computation in the table above. So for instance in RNA rounding, G is set so we return 1001+1=1010. For RX rounding G|S is true so we set L to 1 (it's already 1, so in this case nothing changes) and return 1001.

Particular embodiments will now be described with reference to the figures.

FIG. 1 illustrates a data processing apparatus 100 in accordance with one embodiment. The data processing apparatus receives an input value (in redundant representation) to be rounded. In other words, the input value is provided as a pair of words A and B. In this embodiment, the input value is provided as the result from digit recurrence division circuitry, which performs a floating-point division operation, and is therefore a quotient value. An additional output from this circuitry, as a result of the division operation, is a residual (remainder) value. The residual value is also provided in redundant representation, and hence, an addition operation must be performed in order to, for example, determine the sign of the residual value.

The input value is provided to floor calculation circuitry 105 and ceiling calculation circuitry 110. The floor calculation circuitry 105 provides a candidate floor value of the input value to selection circuitry 115 and the ceiling calculation circuitry 110 provides a candidate ceiling value of the input value to the selection circuitry 115. The selection circuitry 115 then determines whether to output the candidate floor value or the candidate ceiling value as the rounded non-redundant represented version of the input value A, B.

The floor calculation circuitry 105 is made up from two adder circuits 120, 125. Each of the adder circuits 120, 125 receives both of the input words A and B and adds these together in order to change the redundant representation into a non-redundant representation. One of the adder circuits 125 additionally adds a '1' by setting a carry signal to '1'. The outputs from the two adder circuits 120, 125 are A+B and A+B+1 respectively. In this way, the two outputs correspond with the conversion of the input value into non-redundant representation assuming that an associated residual value is positive (in the case of A+B+1) or negative (in the case of A+B). These two candidates are provided to a multiplexer 130, which is switched based on a sign of the associated residual value. Accordingly, A+B+1 is selected if the residual value is positive and A+B is selected if the residual value is negative. The result is referred to as NR and represents the non-redundant non-truncated result.

The ceiling calculation circuitry 110 is also made up from two adder circuits 135, 140. Each of these adder circuits 135, 140 receives both of the input words A and B, as well as a difference, incr, between the floor value and ceiling value. The value of incr is $2^{x+2}$ if there is a round bit, and $2^{x+1}$ if there is not a round bit, where x is the number of excess bits. These are added together. In addition, one of the adder circuits 135 additionally adds a '1' by setting a carry-signal to '1'. The outputs from these two adder circuits 135, 140 are A+B+incr and A+B+incr+1 respectively. In this way, the two outputs correspond with the conversion of the input value into a highest possible non-redundant representation assuming that an associated residual value is positive (in the case of A+B+incr+1) or negative (in the case of A+B+incr). These two candidates are then provided to a multiplexer 145, which is switched based on a sign of the associated residual value. Accordingly, A+B+incr+1 is selected if the residual value is positive and A+B+incr is selected if the residual value is negative. The result is referred to as NR+incr (or simply INCR) and represents the highest value that the input value can take, in non-redundant representation.

Selection circuitry 115 is made up from the two multiplexers 130, 145 as well as a third multiplexer 150. The third multiplexer 150 determines whether the final rounded result corresponds with the floor value NR or the ceiling value NR+incr (INCR) and is switched according to one or more of L; the least significant bit of NR, G, the guard bit of NR; R the rounding bit of NR (if any); and S the sticky bit of NR. The bits that are used to perform the switching, and the actual decision that is made depends on the rounding mode and specific implementations of the multiplexer 150 will be known to the skilled person. For example, consider the situation in which n (the number of fractional bits in the rounded output) is 7. The leftmost of these bits is the integer bit. For the purposes of this example, x (the number of excess bits) is 3. The input value in this example is greater than or equal to 1.0 and less than 2.0. Accordingly, there is no rounding bit. In particular, in redundant representation, the input value is given by the inputs A=$0_{13}$ 1101011_1010 and B=1_0001010_0011. We also assume that the sign of the residual is 1 (i.e. a negative residual). In order to use the rounding mode "round to nearest, ties to away" (RNA), we make the following observations:

The value of incr=$2^{(x+1)}$=16.
A+B is therefore 1_1110101_1101.
A+B+1 is therefore 1_1110101_1110.
A+B+incr is therefore 1_1110110_1101.
A+B+incr+1 is therefore 1_1110110_1110.

Since the sign of the residual is 1, the floor value NR=A+B and the ceiling value INCR=A+B+incr. The L, G, and S bits (there is no round bit R because the value is already at least 1.0 and less than 2.0) are derived from the input value (i.e. the floor value). Therefore, L=1, G=1, and S=1. As described above, in RNA, if G=1 then we increment the truncated value, i.e. we use the truncation of INCR rather than the truncation of NR. The rounded result is therefore 1_1110110. Note that in the embodiment shown in FIG. 1, the calculation of the sign of the residual value can take place substantially in parallel with adder circuits 120, 125, 135, and 140. Accordingly, the determination of the sign of the residual value need not lie on the critical path for performing the rounding operation and is provided to the two multiplexers 130, 145. By removing this determination from the critical path, the speed of the rounding operation can be improved compared to operations where the determination is part of the critical path.

Figure 2:
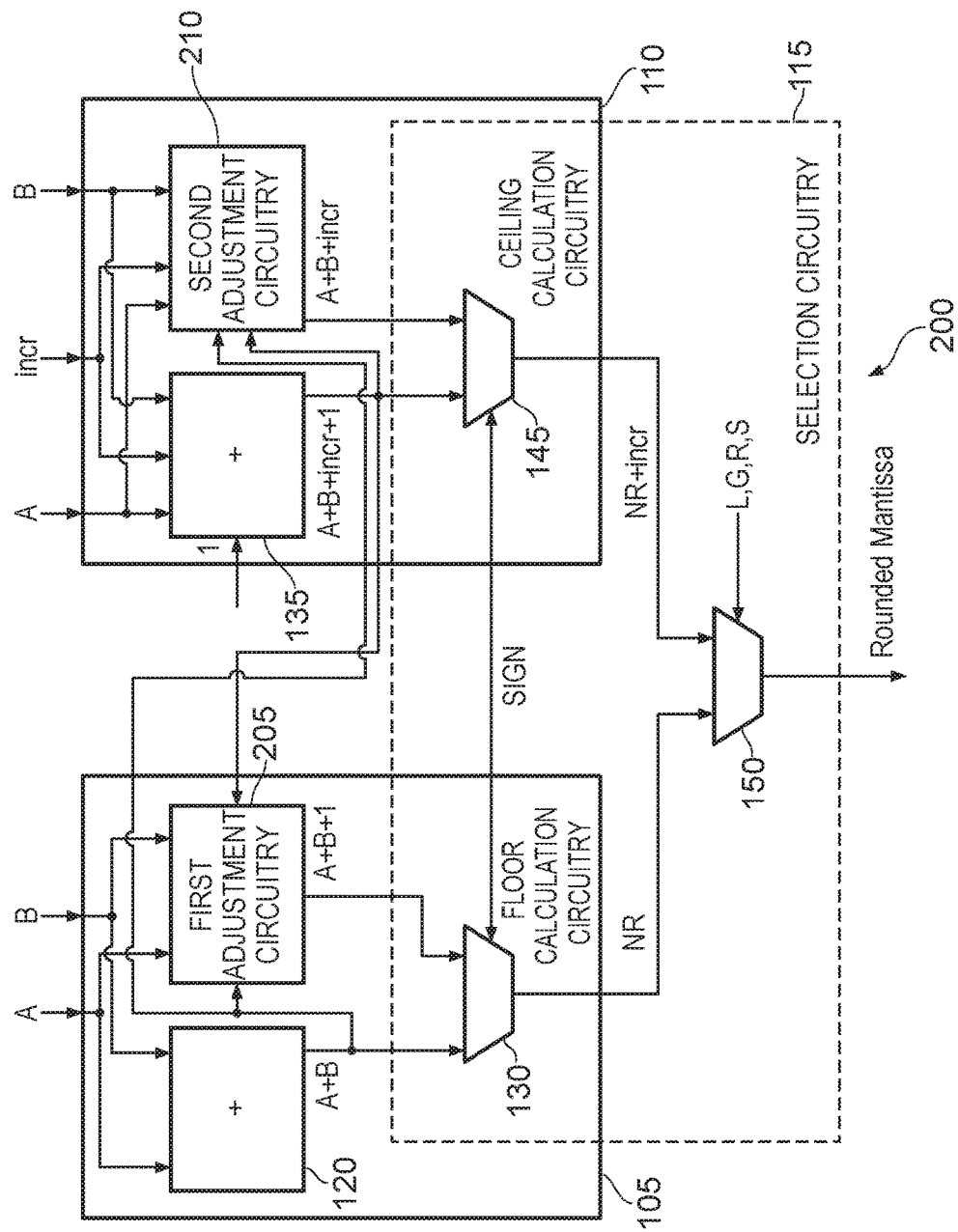
FIG. 2 schematically illustrates a data processing apparatus for rounding in accordance with one embodiment.

FIG. 2 illustrates an embodiment in which one of the adder circuits 125 of the floor calculation circuitry 105 and one of the adder circuits 140 of the ceiling calculation circuitry 110 have been replaced by a first adjustment circuitry 205 and second adjustment circuitry 210 respectively. The first adjustment circuitry 205 and second adjustment circuitry 210 use simple logic to derive A+B+1 and A+B+incr respectively and accordingly, the data processing apparatus 200 is smaller than the data processing apparatus 100 in the embodiment shown in FIG. 1. The first adjustment circuitry derives A+B+1 from the input words A and B, the output from the adder circuit 120 of the floor calculation circuitry A+B and the output from the adder circuit 135 of the ceiling calculation circuitry 110 A+B+incr+1. Appropriate circuitry for the first adjustment circuitry 205 and the second adjustment circuitry 210 are shown in FIGS. 3A and 3B respectively.

Figure 3A:
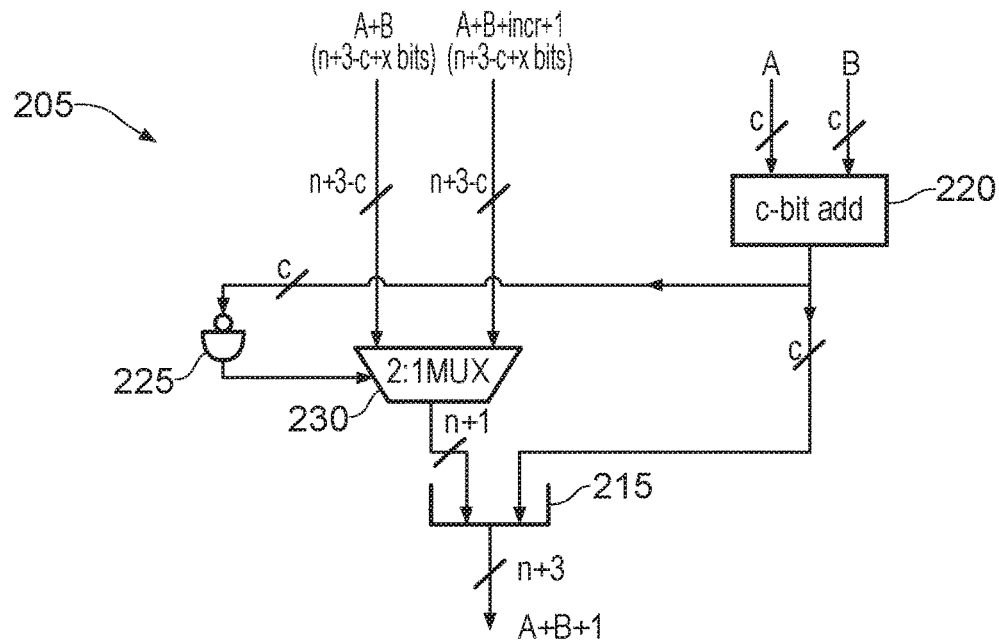
FIG. 3A illustrates a circuit diagram for the first adjustment circuitry in accordance with one embodiment.

FIG. 3A illustrates an embodiment of the first adjustment circuitry 205. Such circuitry includes a 2:1 multiplexer 230. The 2:1 multiplexer 230 receives two inputs, the top n+3-c bits of A+B and the top n+3-c bits of A+B+incr+1 where 'n' is the number of fractional bits of the input value, 'c' is determined by the equation ceiling($\log_2$(incr+1)), and 'x' is the number of excess bits. The source of the value '3' will be explained later in the description of FIG. 4. The width of the 2:1 multiplexer 230 is n+3-c bits. Note that regardless of whether there is a rounding bit or not, n+3-c=n. The number of excess bits depends on the number of bits produced by the preceding circuitry. If the preceding circuitry is a digit-recurrence radix-4 floating point double precision number then 54 bits will be output. This is because 53 bits would be required for the number (52 fractional bits and one guard bit). However, if the preceding circuitry is both digit recurrence and radix-4, each iteration of the device produces a pair of bits. Consequently, it would not be possible to produce exactly 53 bits and so 54 bits would be output instead. As a result, there would be 54−53=1 excess bit, i.e. x=1. Accordingly, c=3. The 2:1 multiplexer 230 selects one of these two inputs as the output, which is provided as the top set of bits in a concatenation unit 215. The first adjustment circuitry 205 also includes a c-bit adder 220. This adds together 'c' bottom (least significant) bits from the input words A and B. The bits are added together and the result is provided to the concatenation unit 215 as the bottom 'c' bits. In addition, the output is provided to NAND gate 225, the output of which is used as the selection signal of the 2:1 multiplexer 230. In effect, if the addition of the bottom 'c' bits causes an overflow (i.e. if the result is more than $2^c-1$) then the remaining bits from the value A+B+incr are used since those bits reflect the result of an overflow of the first 'c' bits, otherwise the remaining bits from the value A+B are used. The result of this logic is that the value A+B+1 is derived without the use of adder circuitry.

Figure 3B:
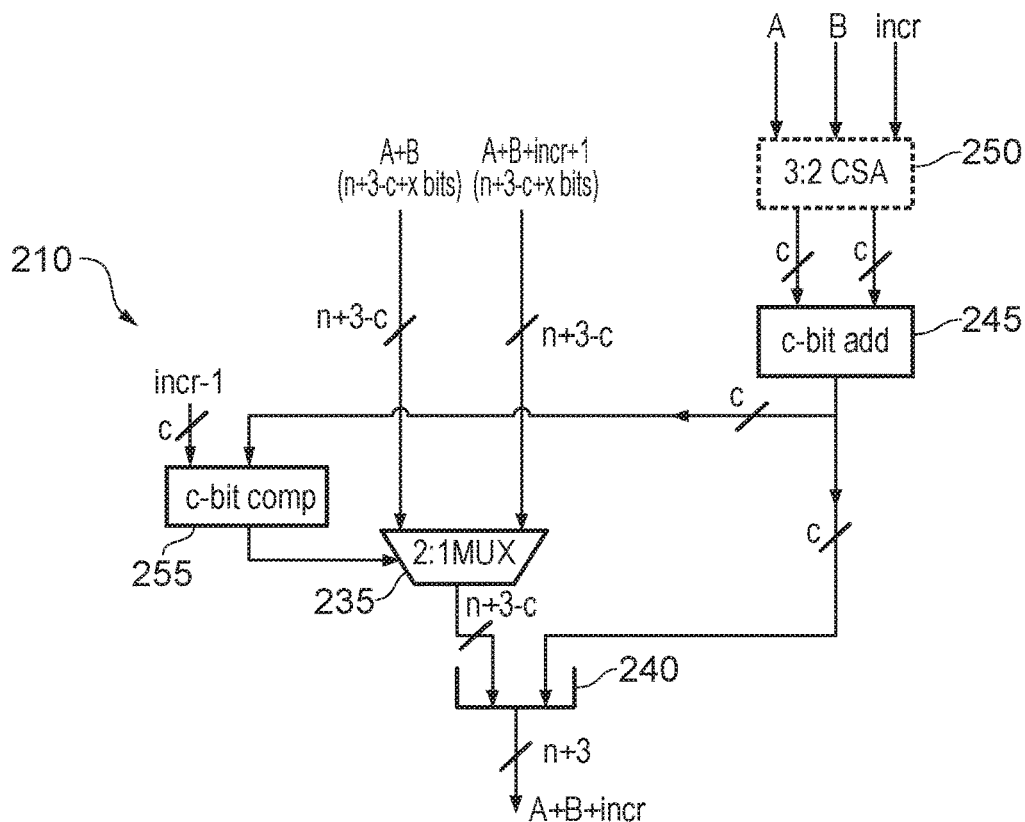
FIG. 3B illustrates a circuit diagram for the second adjustment circuitry in accordance with one embodiment.

FIG. 3B illustrates an embodiment of the second adjustment circuitry 210. Such circuitry includes a 2:1 multiplexer 235. The 2:1 multiplexer 235 receives two inputs, the top n+3-c bits of A+B and the top n+3-c bits of A+B+incr+1, where 'n' is the number of fractional bits of the input value, and 'c' is determined by the equation ceiling($\log_2$incr+1)). Again, the source of the constant '3' will be explained with respect to FIG. 4. Consequently, the width of the 2:1 multiplexer 235 is at most n+3−c=n bits. The 2:1 multiplexer 235 selects one of these two inputs as the output, which is provided as the top set of bits in a concatenation unit 240. A Carry Save Adder 250, which forms part of the adder circuitry 125 in the ceiling calculation circuitry 110, adds the inputs A and B, and incr. In the second adjustment circuitry 210, the result is received by a c-bit adder 245 that adds the 'c' bottom (least significant) bits together to produce an output. The result is provided to the concatenation unit 240 as the bottom 'c' bits. In addition, the c least significant bits that are output by the c-bit adder 245 are checked and compared against incr-1. If those bits are less than incr-1 then the bits of A+B are output by the multiplexer 235, otherwise the bits of A+B+incr+1 are output by the multiplexer 235. The effect of this circuitry is that the value A+B+incr is derived without the use of wide adder circuitry. Only a much smaller c-bit adder circuit is needed.

Figure 4:
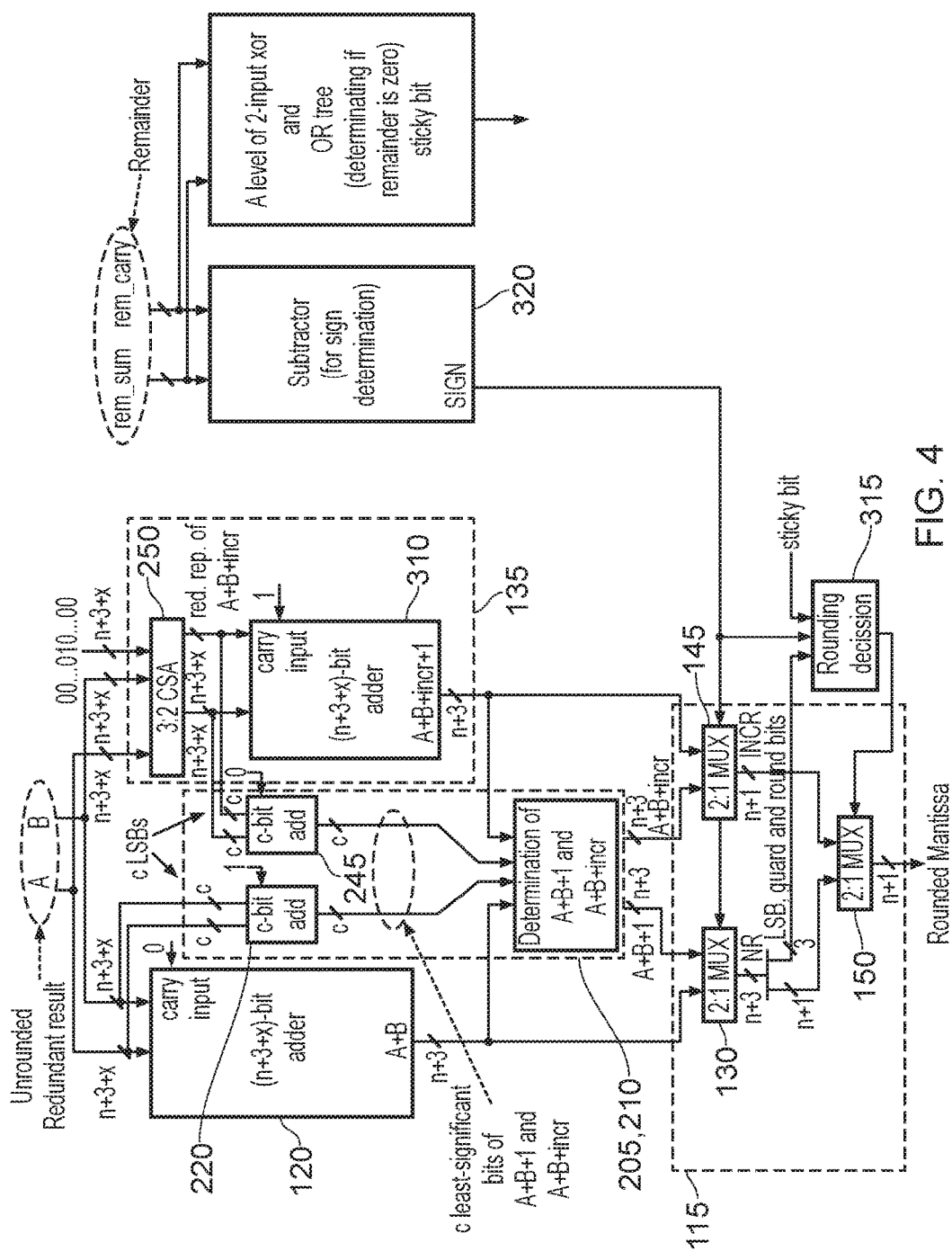
FIG. 4 illustrates a circuit diagram corresponding with a data processing apparatus in accordance with one embodiment.

FIG. 4 is of a circuit diagram that corresponds with the schematic diagram shown in FIG. 2. The same reference numerals have been used where features are the same to illustrate the resemblance between the schematic and the circuit diagram. As shown, the input value is provided as two words, A and B. These are provided to first adder circuitry 120 in the form of an (n+3+x) bit adder and a second adder circuitry 135, which is made up of a 3:2 Carry Save Adder (CSA) 250 followed by an (n+3+x) bit adder 310. In this example, the input is made up of an integer bit, n fractional bits, a guard bit, a round bit, and x excess bits. Accordingly, there are 1+n+1+1+x=n+3+x bits. The first adder circuitry 120 and the second adder circuitry 135 receive the inputs, but only output the top n+3 bits and therefore do not output bits that correspond with the excess bits. Of these n+3 bit outputs, the top n+3-c bits are passed to the first adjustment circuitry 205 and second adjustment circuitry 210 as shown in FIGS. 3A and 3B respectively.

The CSA 250 also receives incr as an input. The third multiplexer 150 receives inputs as previously discussed. In addition, a rounding decision unit 315 outputs a switching signal to the third multiplexer 150, which collectively determines which of the inputs to the third multiplexer (the ceiling value or the floor value) is output as the final rounded value. As previously discussed, the value of the switching signal is dependent on the rounding mode being used together with certain bits from the floor value—which can include any number of: the Least Significant Bit of the fractional bits (LSB), the guard bit (the bit after the LSB), the round bit (the bit after the guard bit, if present). A further input includes the sticky bit, which is a logical OR of all the bits after the round bit (if present) or after the guard bit (if the round bit is not present). In addition, the embodiment shown in FIG. 4 includes subtraction circuitry 320, which operates on the residual value associated with the input value, the residual value being provided in redundant representation (rem_sum and rem_carry). The subtraction circuitry 320 is used to provide a value of the sign of the residual value, in non-redundant representation. This is provided to the first multiplexer 130 and the second multiplexer 145 in order to determine which input to select for the floor value and ceiling value respectively.

Figure 5A:
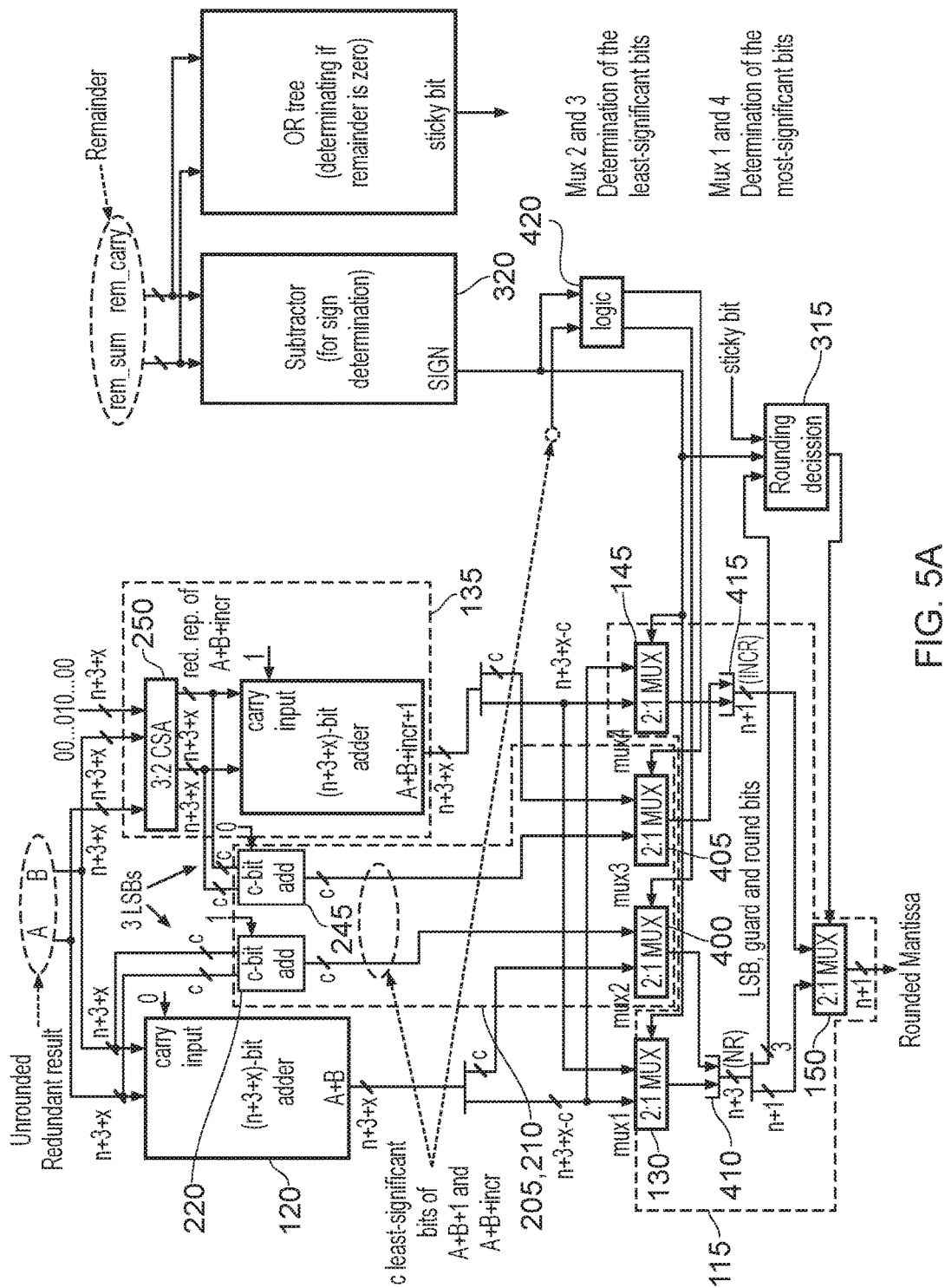
FIG. 5A illustrates a circuit diagram corresponding with a data processing apparatus in accordance with one embodiment.

FIG. 5A illustrates an embodiment in which the first and second adjustment circuitry 205, 210 have been further simplified, resulting in a reduced circuit and potentially resulting in a reduction of delay of the critical path. In particular, each of the first and second adjustment circuits 205, 210 comprises a c-bit adder 220, 245 as before. Additionally, the first and second adjustment circuits 205, 210 each comprise a smaller 2:1 multiplexer 400, 405. Each 2:1 multiplexer 400, 405 receives as inputs, c bits from the corresponding c-bit adder 220, 245 and the lower c bits output from the corresponding adder 120, 135. Consequently, the width of these 2:1 multiplexers is c bits (i.e.

fewer than n bits used in the embodiment shown in FIGS. 3A and 3B). The selection signal for each of these 2:1 multiplexers 400, 405 is the sign of the residual value that corresponds with the input value.

The first and second multiplexers 130, 145 of the selection circuitry 115 are also modified. In this embodiment, each such multiplexer 130, 145 receives as inputs, the remaining n+3+x-c bits from each adder 120, 135. Accordingly, the size of these multiplexers is also reduced as compared to the embodiment shown in FIG. 4. The first multiplexer 130 and the second multiplexer 145 of the selection circuitry 115 are switched according to the sign of the residual value. The multiplexers 400, 405 in the first and second adjustment circuitry 205, 210 are switched according to outputs from logic circuit 420. The logic circuit is shown in more detail in FIG. 5B.

The output of the multiplexers 130, 145 of the selection circuitry 115 are concatenated with the output of the multiplexers 400, 405 in the first and second adjustment circuitry 205, 210 using concatenation units 410, 415 and the top n+1 bits output by each concatenation unit 410, 415 are provided as the candidate floor value and ceiling value, respectively, to the third multiplexer 150.

Accordingly, rather than actually calculating the values A+B+1 and A+B+incr, multiplexers 400, 405 are used to determine whether the lower bits of A+B or A+B+1 should be used to produce the candidate floor value (and similarly, whether the lower bits of A+B+incr or A+B+incr+1 should be used to produce the candidate ceiling value) and these are combined with the remaining upper bits to actually form the candidate floor value (and similarly, the candidate ceiling value). Effectively, the multiplexers of the first adjustment circuitry 205 and the second adjustment circuitry 210 shown in FIGS. 3A and 3B respectively are placed in parallel with the multiplexers 130 145 shown in FIG. 5 in order to save time and area.

Figure 5B:
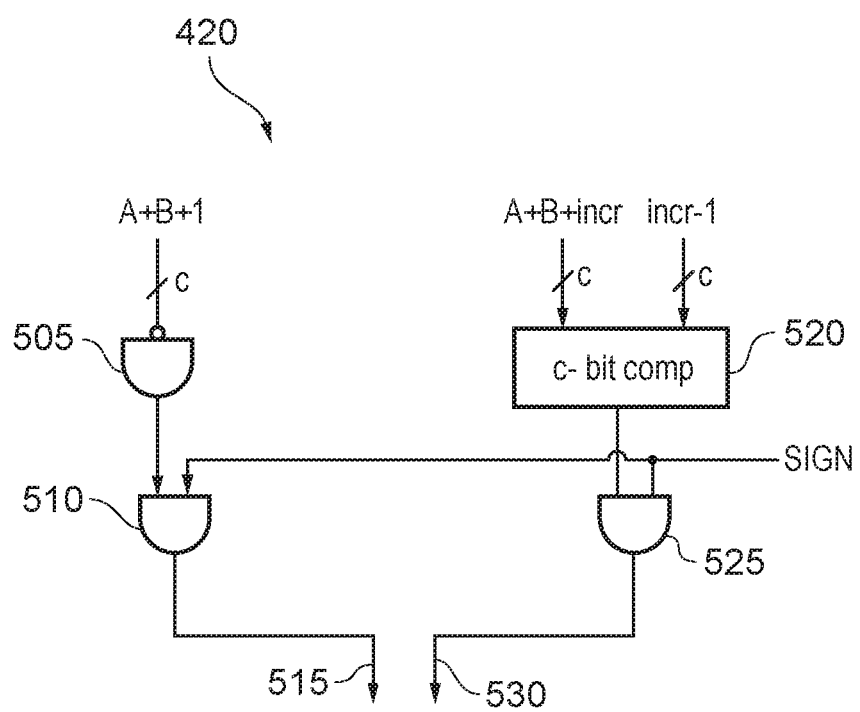
FIG. 5B illustrates a circuit diagram showing an example embodiment of the logic circuit shown in FIG. 5A.

FIG. 5B schematically illustrates an example of the logic circuit 420 in FIG. 5A. NAND gate 505 receives c bits from c-bit adder 220. These bits correspond with the value A+B+1. The output from the NAND gate 505 is provided to an AND gate 510 together with the value SIGN, which corresponds with the sign of the residual value and can originate from the subtraction circuitry 320. The output of the AND gate 510 is a first output value 515, which is provided to the first multiplexer 130 of the selection circuitry 115. A c-bit comparison unit 520 receives c-bits from G-bit adder 245. These bits correspond with the value A+B+incr. The comparison unit 520 also receives the value incr-1. The result of the comparison is provided to AND gate 525 together with the value SIGN. The output from this AND gate 525 is provided as a second output value 530, which is provided to mux3, the multiplexer 405 of the second adjustment circuitry 210.

Figure 6:
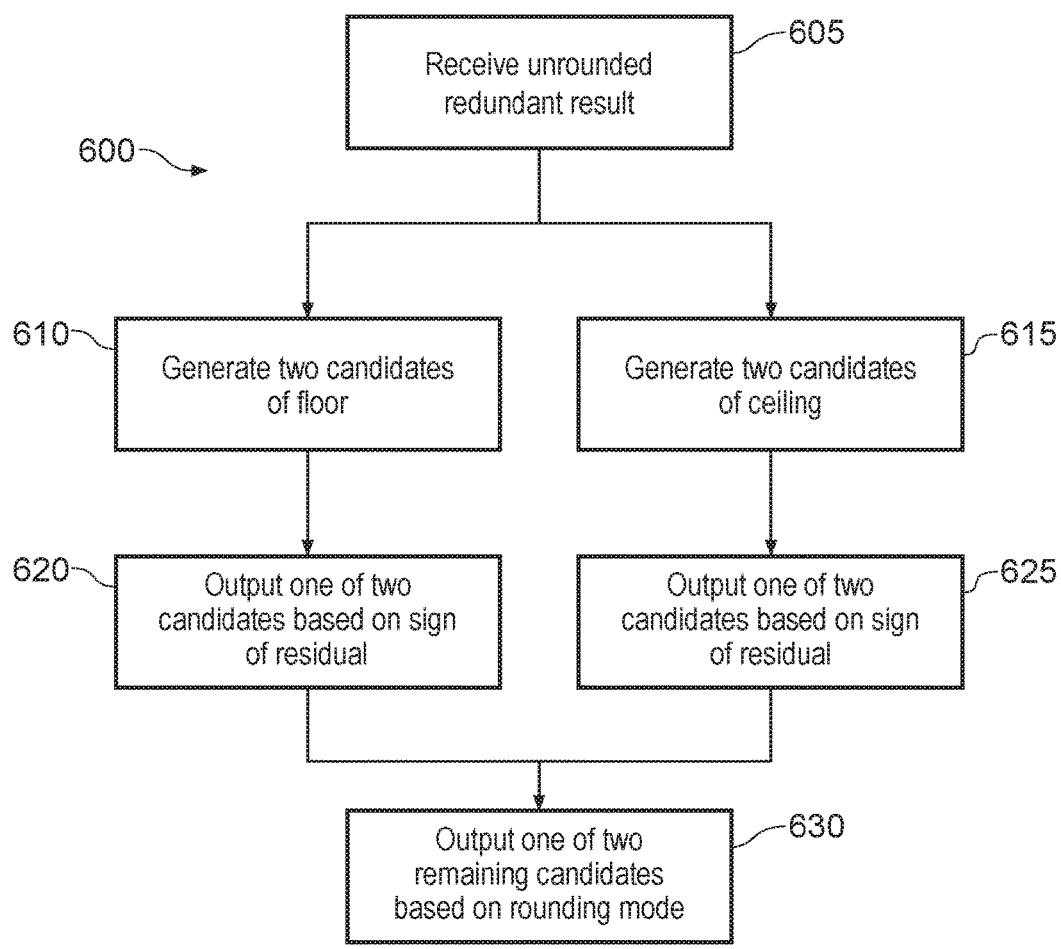
FIG. 6 shows a flow chart that illustrates a method of data processing in accordance with one embodiment.

FIG. 6 shows a flowchart 600 that illustrates a method of data processing in accordance with one embodiment. In step 605, the input value is received in redundant representation. Steps 610 and 615 occur substantially in parallel and so at step 610, two candidate floor values are produced whilst at step 615, two candidate ceiling values are produced. After having generated the two candidate floor values, at a step 620 one of the two candidates is output based on a sign of a residual value associated with the input value. Similarly, after having generated the two candidate ceiling values, at a step 625 one of the two candidates is output based on a sign of the residual value associated with the input value. Steps 620 and 625 also occur substantially in parallel. The residual value is associated with the input value in the sense that the input value and residual value derive from the same operation. For example, the residual value could be the residual value left over from a division operation (i.e. a remainder) that produces the input value. Finally, at step 630, one of the two remaining candidates (one ceiling candidate and one floor candidate) is output having regard to the rounding mode as well as one or more of a guard bit, rounding bit, sticky bit, and least significant bit of the floor value. It will be appreciated that the process of determining the sign of the residual occurs substantially in parallel with the generation of the candidates at steps 610 and 615 such that the determination of the sign is not on the critical path for the output of the rounded value and so the time taken to output the rounded value can be reduced as compared to other previously proposed embodiments in which the determination of the sign is on the critical path.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

I claim:

1. A data processing apparatus to perform rounding on an input value to produce a rounded form output value, said data processing apparatus comprising:
   floor calculation circuitry to receive said input value in redundant-representation and to generate two candidates of a floor of said input value in non-redundant representation, wherein said floor calculation circuitry comprises first adder circuitry and third adder circuitry;
   ceiling calculation circuitry to receive said input value in redundant-representation and to generate two candidates of a ceiling of said input value in non-redundant representation, wherein said ceiling calculation circuitry comprises second adder circuitry and fourth adder circuitry,
   wherein said first adder circuitry, said second adder circuitry, said third adder circuitry, and said fourth adder circuitry are arranged to perform substantially in parallel;
   selection circuitry to output one of said two candidates of said floor of said input value and said two candidates of said ceiling of said input value as said rounded form output value, based on said sign of said residual value associated with said input value,
   wherein each of said two candidates of said floor of said input value correspond with different values of said sign of said residual value and each of said two candidates of said ceiling of said input value correspond with different values of said sign of said residual value.

2. A data processing apparatus according to claim 1, wherein said residual value is received by said data processing apparatus in redundant representation.

3. A data processing apparatus according to claim 2, further comprising:
residual conversion circuitry to convert said residual value from redundant representation to non-redundant representation.

4. A data processing apparatus according to claim 3, wherein
said residual conversion circuitry operates to convert said residual value prior to said sign of said residual value being required by said selection circuitry.

5. A data processing apparatus according to claim 1, wherein said selection circuitry comprises:
first selection circuitry to select one of said two candidates of said floor of said input value as said floor of said input value, based on said sign of said residual value;
second selection circuitry to select one of said two candidates of said ceiling of said input value as said ceiling of said input value, based on said sign of said residual value; and
third selection circuitry to select one of said floor of said input value and said ceiling of said input value.

6. A data processing apparatus according to claim 5, wherein
said third selection circuitry is to select one of said floor of said input value and said ceiling of said input value based on a rounding mode and a subset of least significant bits of said input value.

7. A data processing apparatus according to claim 6, wherein
said third selection circuitry is to select one of said floor of said input value and said ceiling of said input value further based on said residual value.

8. A data processing apparatus according to claim 1, wherein
said input value is made up of a first input word and a second input word;
said first adder circuitry performs an addition based on said first input word and said second input word to produce one of said two candidates of said floor of said input value; and
said second adder circuitry performs an addition based on said first input word, said second input word, a difference between said ceiling value and said floor value, and a binary value '1' to produce one of said two candidates of said ceiling of said input value.

9. A data processing apparatus according to claim 8, wherein
said third adder circuitry performs an addition based on said first input word, said second input word, and a binary value '1' to produce a second of said two candidates of said floor of said input value; and
said ceiling calculation circuitry comprises fourth adder circuitry performs an addition based on said first input word, said second input word, and a difference between said ceiling value and said floor value to produce a second of said two candidates of said ceiling of said input value.

10. A data processing apparatus according to claim 8, wherein
said floor calculation circuitry comprises first adjustment circuitry to produce a second of said two candidates of said floor of said input value based on said one of said two candidates of said floor of said input value, said first input word, said second input word, and said one of said two candidates of said ceiling of said input value; and
said ceiling calculation circuitry comprises second adjustment circuitry to produce a second of said two candidates of said ceiling of said input value, based on said one of said two candidates of said floor of said input value, said first input word, said second input word, said difference between said ceiling value and said floor value, and said one of said two candidates of said ceiling of said input value.

11. A data processing apparatus according to claim 10, wherein
said first adjustment circuitry and said second adjustment circuitry each comprise a 2:1 multiplexer that receives inputs based on said one of said two candidates of said floor of said input value and said one of said two candidates of said ceiling of said input value.

12. A data processing apparatus according to claim 11, wherein
each said 2:1 multiplexer has a width of at least n bits, where n is a number of fractional bits of said input value.

13. A data processing apparatus according to claim 11, wherein
each said 2:1 multiplexer has a width of at least ceiling $(\log_2(2^{x+2}+1))$ bits and less than n bits, where x is a number of excess bits of said input value.

14. A data processing method to perform rounding on an input value to produce a rounded form output value, said data processing method comprising steps:
receiving said input value in redundant-representation;
generating, by first adder circuitry and third adder circuitry, two candidates of a floor of said input value in non-redundant representation;
generating, by second adder circuitry and fourth adder circuitry, two candidates of a ceiling of said input value in non-redundant representation,
wherein said first adder circuitry, said second adder circuitry, said third adder circuitry, and said fourth adder circuitry perform substantially in parallel;
outputting one of said two candidates of said floor of said input value and said two candidates of said ceiling of said input value as said rounded form output value, based on a sign of a residual value associated with said input value,
wherein each of said two candidates of said floor of said input value correspond with different values of said sign of said residual value and each of said two candidates of said ceiling of said input value correspond with different values of said sign of said residual value.

15. A data processing apparatus to perform rounding on an input value to produce a rounded form output value, said data processing apparatus comprising:
means for receiving said input value in redundant-representation and for generating two candidates of a floor of said input value in non-redundant representation;
means for receiving said input value in redundant-representation and for generating two candidates of a ceiling of said input value in non-redundant representation;
wherein said means for generating two candidates of said floor and said means for generating two candidates of said ceiling perform substantially in parallel;

means for outputting one of said two candidates of said floor of said input value and said two candidates of said ceiling of said input value as said rounded form output value, based on a sign of a residual value associated with said input value, wherein each of said two candidates of said floor of said input value correspond with different values of said sign of said residual value and each of said two candidates of said ceiling of said input value correspond with different values of said sign of said residual value.

* * * * *